Nov. 17, 1964

H. ALLEN 3,157,190

BALL VALVE

Filed May 26, 1960

Herbert Allen
INVENTOR.

BY
Browning, Simms, Hyer
& Eickenroht

Nov. 17, 1964   H. ALLEN   3,157,190
BALL VALVE
Filed May 26, 1960   6 Sheets—Sheet 2

Herbert Allen
INVENTOR.

BY Browning, Simms, Hyer & Eickenroht

Nov. 17, 1964  H. ALLEN  3,157,190
BALL VALVE

Filed May 26, 1960  6 Sheets—Sheet 3

Herbert Allen
*INVENTOR.*

BY Browning, Simms, Hyer
& Eickenroht

Fig. 7

Herbert Allen
INVENTOR.

BY Browning, Simms, Hyer & Eickenroht

Fig. 8

Herbert Allen
INVENTOR.

United States Patent Office 3,157,190
Patented Nov. 17, 1964

3,157,190
BALL VALVE
Herbert Allen, Houston, Tex., assignor to Cameron Iron Works, Inc., Houston, Tex.
Filed May 26, 1960, Ser. No. 31,867
3 Claims. (Cl. 137—330)

This invention relates generally to improvements in ball-type rotary plug valves.

Transcontinental pipelines have created an ever increasing demand for larger valves. As the size of a valve increases, the cost of material becomes a greater consideration relative to the labor involved in its manufacture. For this reason, plug type rotary valves are preferred for pipeline and other uses in which they are of a large size, because they do not have to house a reciprocating valve member in both its opened and closed positions. Ball valves are particularly preferred because it is easier to provide a tight seal between a ball-shaped valve member and its seat than between other types of rotary plug valve members and their seats.

Also, a ball-shaped valve member has smaller outside dimensions than other types of rotary plug valve members with equal flow capacities. Therefore, theoretically at least, the valve bodies for enclosing such ball-shaped valve members should be substantially smaller than the bodies for enclosing the other rotary plug valve members. Furthermore, it is well known that, for any given thickness, a spherical wall provides maximum strength for containing pressure within the valve. Unfortunately, however, commercially available ball valves of this type have not taken advantage of these inherent advantages because they uniformly have large, bulky bodies.

This is primarily attributable to the fact that ball valve manufacturers have concerned themselves with the replacement and repair of the valve member and seats by their insertion and removal through an access opening other than the inlet to or outlet from the valve body. In any "full opening" valve of this type, the opening through the plug member is as large as the line in which the valve is disposed, and, consequently, the plug member has a larger outside dimension than the inlet to and outlet from the valve body which connect the opposite ends of the body to the line so that it is not removable therethrough.

Obviously, this access opening must be closed by a joint having sufficient strength to contain the line pressure. Ordinarily, this joint comprises a bonnet which is bolted or otherwise releasably attached to a side opening in the valve body of a size to pass the valve member and seats in a direction radially of the flowway of the valve body. In other valves, it comprises an inlet or outlet section which is removably attached in endwise relation to the remainder of the valve body, the valve member having removable stems or journals which permit it to be inserted and removed axially through the valve body flowway. In any case, these joints for closing the opening have necessitated that the valve body be large and heavy to provide a firm foundation for supporting the parts connecting the joint to the remainder of the body. In pipeline or other uses where the valves are large, the cost of such bodies renders the cost of the over-all valve prohibitive.

These joints are also undesirable in that they quite often provide inexperienced personnel with easy access to interior of the valve. This may result in the valve being opened with the line under pressure. It may also enable such personnel to remove and repair parts in the field which should be repaired only in the shop.

An object of this invention is to provide a ball type rotary plug valve which takes advantage of all the inherent characteristics of the spherical shape of the valve member; and, more particularly, in which the valve body will have the strength of the valve bodies of prior ball valves without the material requirements thereof.

Another object is to provide such a valve in which the valve body is so constructed as to eliminate the need for the heavy removable joints heretofore employed in the bodies of valves of this type, and yet in which the parts susceptible of wear may be repaired or replaced as desired.

Yet another object is to provide a valve which will discourage improper operation and mistreatment in the field.

A more particular object is to provide a ball-type valve in which access may be had to its interior only upon its removal from the line, and even then only with the use of equipment not normally available in the field.

A still further object is to provide a ball type rotary plug valve having a compact mechanism for distributing the wear about the seats during operation of the valve; and, more particularly, a mechanism which is protected from damage by improper handling.

Other objects, advantages and features of this invention will be apparent to one skilled in the art upon a consideration of the written specification, the annexed claims and the attached drawings.

In accordance with one novel aspect of my invention, the ball-shaped valve member is mounted within a valve body which merely comprises parts assembled about it and connected together along a plane passing through the center of the valve member. Although the valve member is thereby captured against removal from the body, I have found that it may be repaired, when required, without such removal. On the other hand, in accordance with my purpose of discouraging maintenance of this valve in the field, the absence of a joint of the type heretofore employed makes it impossible for unskilled personnel to open the body while it is installed in the line.

The annular seats are movable through the openings in the ends of the connected body parts for engaging the valve member during operation of the valve and for replacement when required. Preferably, the seats are retained in operative position by a means, such as tack welding, which makes their replacement difficult without specialized equipment generally found in the shop. In repairing the valve member and replacing the seats, I propose to rotate the valve member and each of the seats simultaneously and while engaged with one another to lap concentric seating surfaces thereon.

In the manufacture of this valve, I prefer to form the valve body of members which are welded together along a plane passing longitudinally through the center of the ball-shaped valve member, because this enables them to be pressed from flat sheets by a simple metal forming process. The welding of the separate parts of the body to one another will set up certain stresses and strains which would ordinarily make it difficult to obtain a tight seal between the valve member and its seats. I therefore propose to provide the inlet and outlet of the welded body with sealing surfaces for the seats which are axially aligned with respect to the opening through the open valve member.

In the drawings, wherein like reference characters are used throughout to designate like parts.

The valve illustrated in FIGS. 1 to 4, and designated in its entirety by reference character 10, comprises a body 11 having a flowway 12 therethrough with a chamber 13 therein intermediate its opposite ends. One such end may comprise a tubular inlet 14 to the chamber, and the other end a tubular outlet 14a therefrom, although the relationship may be reversed depending upon the direction of flow.

Figure 1:
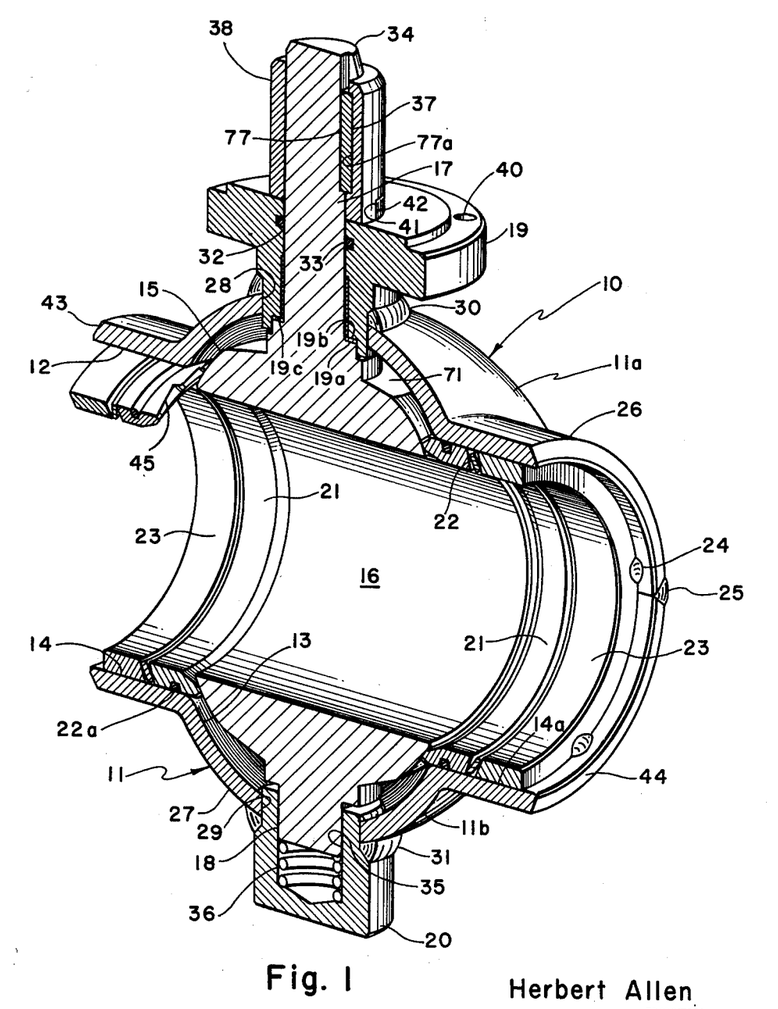
FIG. 1 is a longitudinal sectional view in perspective of one embodiment of a valve constructed in accordance with the present invention.

As best shown in FIG. 1, a ball-shaped valve member 15 is mounted on the body 11 for rotation concentrically within spherical surfaces on the body flowway which form the chamber 13. More particularly, the chamber 13 is spaced from the spherical closure of the valve member 15 to provide clearance for free rotation of the closure as well as to receive the mechanism to be described hereinafter in connection with FIG. 3.

The closure member has a cylindrical opening 16 therethrough and stems 17 and 18 extending from its upper and lower sides along an axis transverse to the axis of the opening 16. The upper stem 17 is journaled for rotation within an upper bearing 19 on the valve body, while the lower stem 18 is journaled for rotation within a lower bearing 20 on such body. As will be understood from FIG. 1, this mounting of the valve member permits it to be rotated between the open position shown in FIG. 1, wherein the opening 16 through the closure is aligned with the inlet 14 and outlet 14a of the valve body, and a closed position in which such opening is disaligned with respect to the inlet and outlet and disposed at approximately 90 degrees to the position shown in FIG. 1. More particularly, the stems 17 and 18 are mounted in the bearings to rotate about a fixed vertical axis and without substantial vertical movement so that the aforementioned clearance between the closure member and chamber 13 of the valve body is maintained constant.

Each side of the valve member 15 is engaged by the inner spherical end of an annular seat 21 slidably received within each of the inlet and outlet. Each seat carries an O-ring 22a or other means thereabout to form a sliding seal with the inlet or outlet in which it is disposed. The inner ends of the seats are urged into tight engagement with the spherical surfaces on the valve member by means of annular Belleville-type springs 22 disposed between the outer ends of the seats and the inner ends of tubular retainers 23 releasably fastened by spot welds 24 or other suitable means to the inlet and outlet of the valve body. Obviously, the seats are easily removed and replaced upon release of the fastening means 24, as by a welding torch, and removal of the tubular retainer and spring behind each such seat.

The inner ends of the seats 21 are of such a width as to engage the valve member seating surfaces with a desired unit pressure. With the inner ends of the seats held against the valve member, and the outer peripheral surfaces thereof forming a sliding seal with either the inlet or outlet, the sealing engagement of the seat on the upstream or inlet side of the valve body with the valve member will be supplemented by the line pressure of the upstream fluid. It will also be noted that, in the preferred form of the valve, the inner diameters of the seats 21 and retainers 23 are at least approximately equal to the diameter of the opening 16 through the valve member so as to provide a full opening through the valve.

Figures 2, 3:
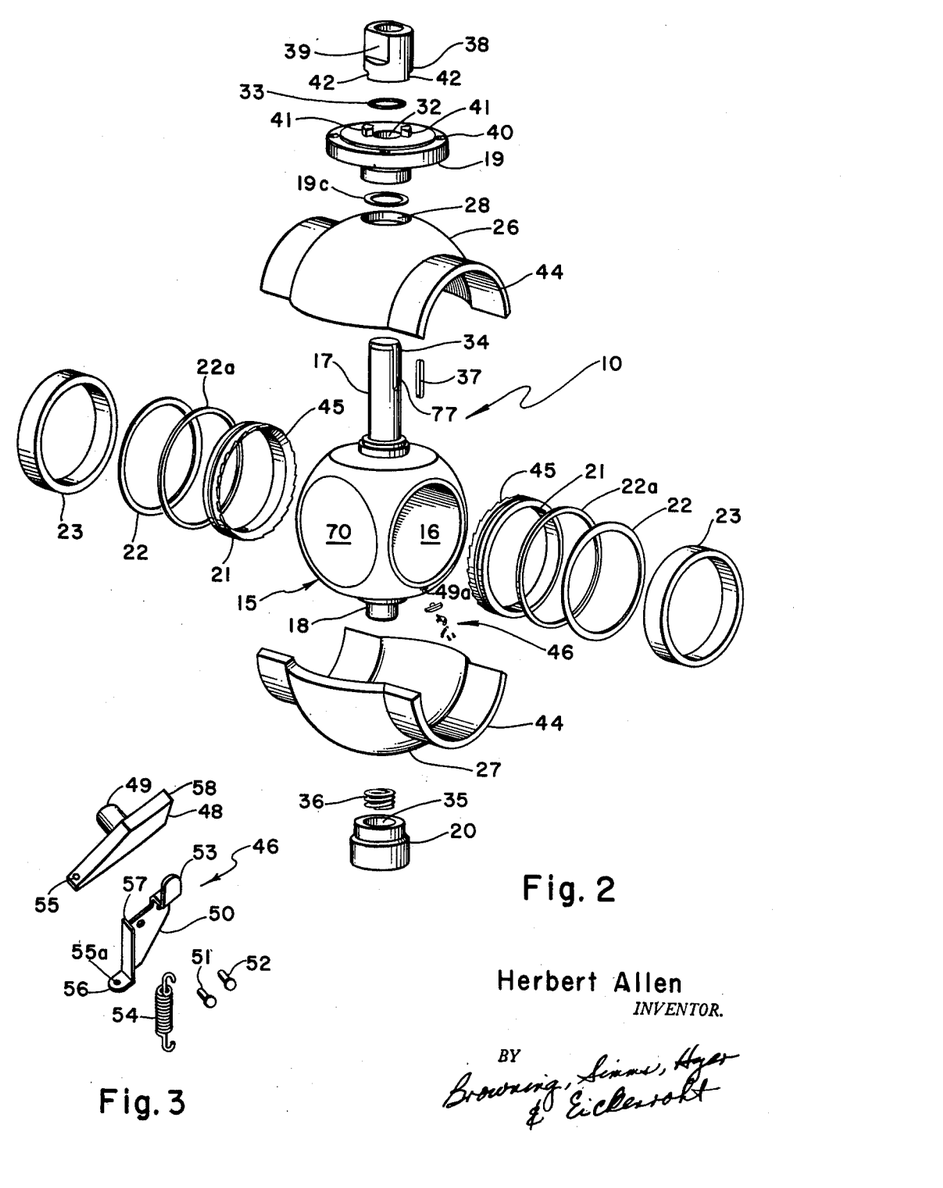
FIG. 2 is an exploded perspective view of the valve shown in FIG. 1.
FIG. 3 is an enlargement of a mechanism shown in FIG. 2 for use in rotating a seat about its opening.

The valve body 11 comprises a pair of valve body parts 11a and 11b which are welded together at 25 along their adjacent longitudinal edges. More particularly, these body parts are welded together along a plane which passes through the center of the valve member and longitudinally through the axis of the flowway through the valve body. Each such body part 11a and 11b has an inner concave surface which is substantially semi-circular in cross section at opposite ends of the part so that, when the parts are brought into edge-to-edge relation preparatory to welding, these end portions form the tubular inlet 14 and outlet 14a of the valve body. The portion of each body part intermediate these end parts is also concave, but is domed spherically so that, again when the body parts are brought together during assembly, they form the previously described spherical chamber.

The above-described end and intermediate portions of the valve body parts 11a and 11b comprise at least substantially identical unitary shell-like members 26 and 27, respectively, each having an opening 28 or 29 through the domed portion thereof. As best shown in FIG. 1, the bearing 19 is received within the opening 28 in member 26 and welded thereto at 30, while the lower bearing 20 is received within the opening 29 of member 27 and connected thereto by means of welding 31. The upper bearing 19 has an opening 32 therethrough which carries an O-ring 33 for sealing about the stem 17, and the upper end 34 of the stem extends through the opening to the exterior of the body to provide a part for connection to an operator (not shown) for the valve member. The lower bearing 20, on the other hand, has a closed lower end and a recess 35 therein which receives the stem 18 and a compression coil spring 36 disposed between the lower end of the stem and the lower end of the recess 35 to normally urge the valve member upwardly into engagement with the upper bearing 19. The upper bearing has a downwardly facing shoulder 19a which supports a ring 19c to receive the thrust of the upwardly facing annular shoulder 19b on the enlarged lower end of the stem 17.

A key 37 is disposed between slots 77 and 77a in the stem 17 and an operating sleeve 38 which, as best shown in FIG. 2, has flattened sides 39 which enable it to be connected with and turned by a suitable operator. The bearing 19 also has a flanged upper end which has bolt holes 40 for connection to the operator, the details of which form no part of the present invention. As shown in FIG. 2, stop parts 41 are disposed upon the top side of the upper flange of the bearing 19 to engage with oppositely disposed surfaces 42 upon the operating sleeve 38 at the extremes of movement of such part so that the valve member is located in its opened and closed positions.

The shell-like members 26 and 27 which are preferably formed in a manner to be described hereinafter, not only reduce to a minimum the amount of material required for constructing the valve body, but also provide optimum resistance to pressures within the body. The opposite ends of the members 26 and 27 form annular end surfaces 43 and 44 on the body having openings therethrough about the inlet and outlet 14 and 14a, respectively, for connection in any suitable manner to the conduit or pipeline in which the valve is to be disposed.

As shown in FIG. 2, a beveled side of the inner end of each seat 21 is provided with ratchet teeth 45 with which a mechanism 46 is cooperable, in response to the opening and closing movement of the valve member, to rotate the seat from one rotational position to another or different position. One such mechanism is mounted on each opposite side of the valve member 15 so that it is protected, along with the valve member, from improper handling. The shifting of each seat about the axis of its opening will distribute the wear upon it, which wear has been found to be otherwise concentrated in one segment thereof.

As shown in FIG. 2, the faces 47 (see FIGS. 4 to 4C) of the teeth 45 on each seat element are disposed in opposite directions with respect to one another. The mechanism 46 for cooperation with each seat 21 is disposed upon the lower side of the valve member beneath the opening 16 therethrough, each such mechanism cooperating with its seat to rotate it in a direction away from the faces of its teeth and opposite to the rotation of the other seat.

Figures 4, 4A, 4B, 4C:
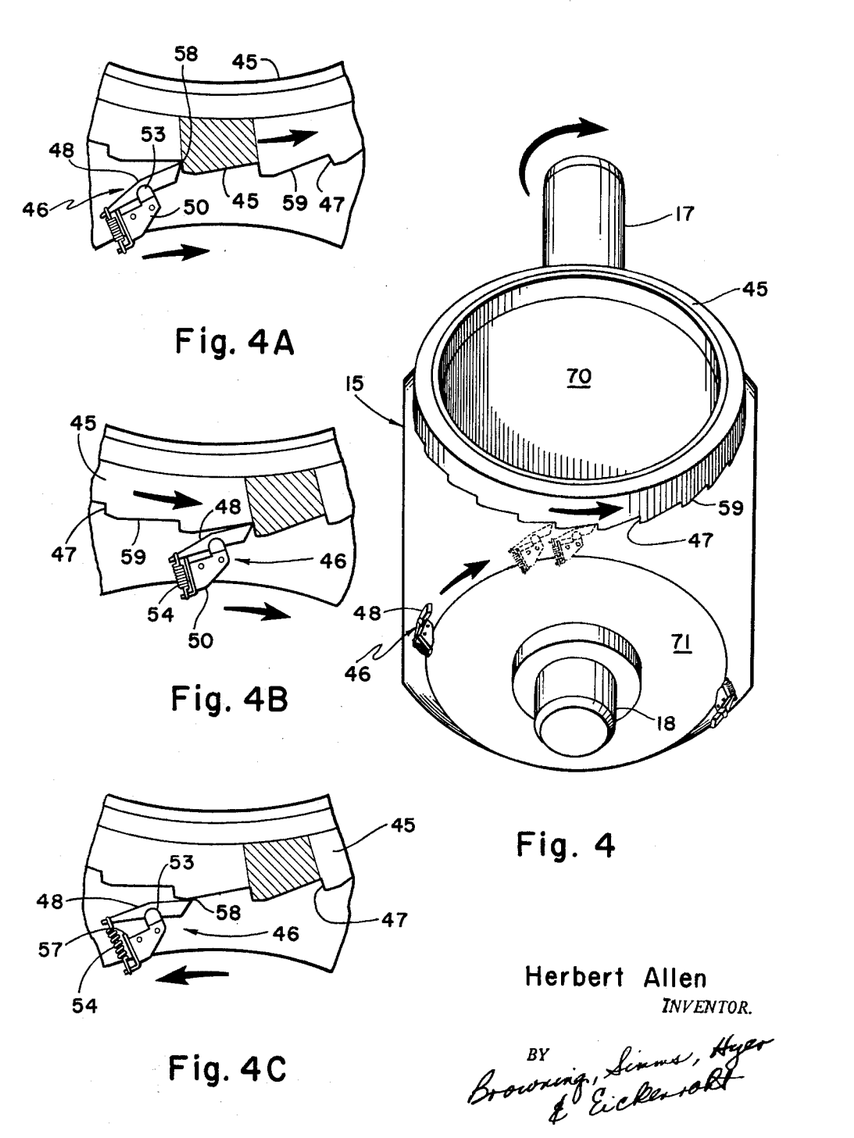
FIG. 4 is an enlarged view of the valve member and one of the seats removed from the body of the valve above described, and showing the mechanism of FIG. 3 mounted on the valve member in operative position with respect to the seat which it rotates.
FIG. 4A is an enlarged detailed view of the mechanism of FIG. 4 as it first engages a tooth about the periphery of the seat during rotation of the valve member from closed to opened position.
FIG. 4B is a view similar to FIG. 4A, but in which the valve member has followed the tooth in moving further in an opening direction so as to rotate the seat in the direction indicated by the arrow.
FIG. 4C is a further view similar to FIGS. 4A and 4B, but in which the valve member has begun a return movement in a closing direction, the mechanism moving with the valve member and sliding over the backs of the teeth of the seat without rotating it.

As shown in FIG. 3, each mechanism comprises a dog 48 having a pin 49 on its inner side insertable within an opening 49a (see FIG. 2) in the surface of the valve member for pivoting with respect thereto. A holder 50 is mounted on the surface of the valve member to one side of the dog by means of pins 51 and 52, as best shown in FIGS. 4 to 4C, and has a flange 53 which fits over the outer side of the dog 48 to hold it adjacent the valve member. The mechanism also includes a coil spring 54 having hooks at each opposite end for reception within openings 55 and 55a in the free end of dog 48 and a flange 56 on the holder 50, respectively. This spring normally urges the free rearward end of the dog downwardly against a stop 57 on the holder so that a tooth engaging edge 58 on its forward end will normally be disposed in a position to engage the face 47 of a tooth 45.

With reference now particularly to FIGS. 4 to 4C, when the valve member is in a closed position, the mechanism 46 will occupy the position shown in solid lines in FIG. 4. As the valve member 15 is rotated toward opened position, however, the mechanism 46 will move therewith to a position toward the end of the opening movement of the valve member in which it will engage the leading face 47 of a tooth 45, which has been shaded in FIGS. 4A to 4C for purposes of clarity. As can be observed from the solid line position of the mechanism 46 shown in FIG. 4, in comparison to the leftmost phantom position thereof shown in the same figure, the valve member may travel through a majority of its turning movement before this engagement occurs. Then, as the opening movement of the valve member continues, the edge 58 of the dog 48 will follow the tooth 45 from the position of FIG. 4A to the position of FIG. 4B. In this latter position, or a position slightly therebeyond, the valve member will reach its full open position so that the dog can move no further.

As best shown in FIGS. 4A to 4C, the backs 59 of the teeth 45 on each seat are tapered gradually so that as the valve member is returned from its opened to its closed position, and particularly during the initial portion of its opening movement, the dog will be moved therewith past the teeth without rotating the seat element. That is, as best illustrated in FIG. 4C, the dog will pivot in a clockwise direction and against the force of the spring 54 so as to slide over the tapered backs 59 of the teeth behind the shaded tooth. As the valve member moves further in a closing direction, the dog 48 will move out of engagement with the teeth 45 and will be returned by the spring 54 to the position shown wherein it engages the stop 57. Thus, upon return of the valve member to opened position, the dog will engage and follow a subsequent tooth of the seat for rotating such seat a further distance about its opening.

In view of the construction of the valve body which reduces to a minimum the material requirements of the valve, the inlet 14 and outlet 14a are each smaller than the least lateral dimension of the closure part of the valve member 15 so that, even apart from the fixed mounting of its stems within the bearings, the valve member could not be moved therethrough. Thus, when the body parts have been so connected to one another, the valve member 15 is "captured" within the body in the sense that it cannot be removed from within the chamber 13 without breaking the welded connection between such parts. That is, as distinguished from prior ball type valves having bodies with readily removable bonnets or end sections through which the valve member may be replaced, the parts 11a and 11b of the valve body of this invention integrally join the inlet 14 and outlet 14a with the bearings 19 and 20 which mount the valve member. In this particular embodiment of the invention, the integral joinder is accomplished by the weldments 30 and 31.

Figures 5, 6:
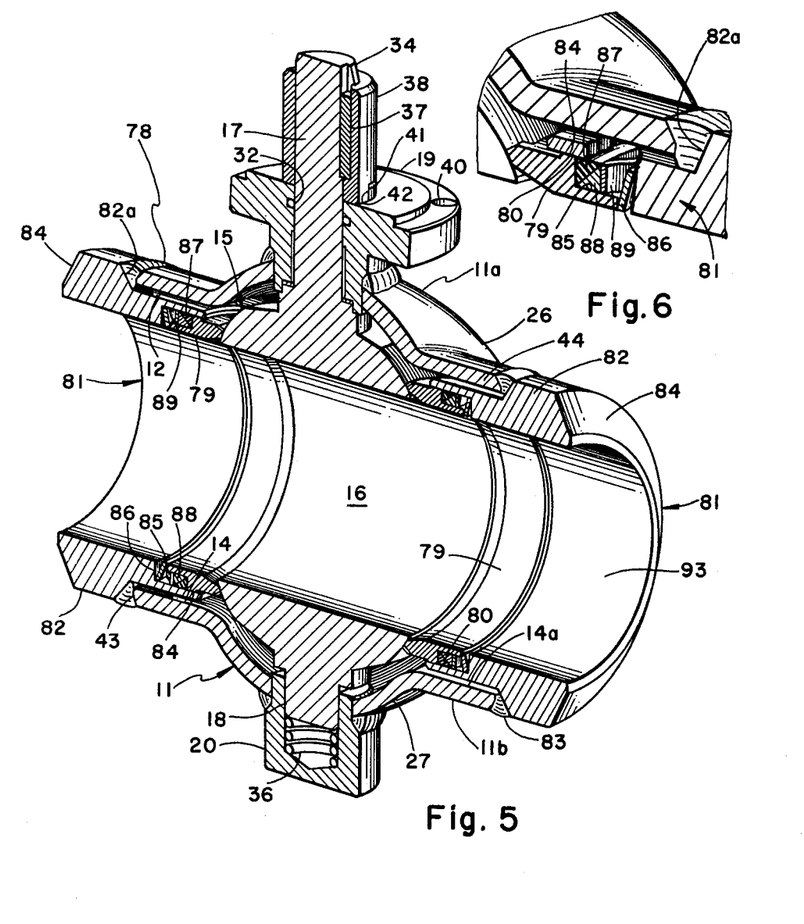
FIG. 5 is a longitudinal sectional view in perspective of another embodiment of a valve constructed in accordance with this invention.
FIG. 6 is an enlarged sectional view of the seat shown in the encircled portion of FIG. 5, a retainer for the seat having been broken away in part.

The valve shown in FIGS. 5 and 6, and indicated in its entirety by reference character 78, is similar in many respects to the valve 10 above described, and where such a similarity exists, identical reference characters have been used. Although not shown, there are mechanisms 46 on each side of the valve member of the valve for engaging and rotating the seats 79 as the valve member is moved between opened and closed positions. It differs from the previously described valve principally in the manner in which such seats are mounted within the inlet and outlet for engagement with opposite sides of the valve member 15. Thus, in accordance with this second embodiment of the invention, each seat comprises an assembly which is sealably and slidably mounted within a counterbore 80 of a tubular member 81 connected as by welding 83 to the valve body 11a with its inner counterbored end extending into the inlet and outlet thereof.

More particularly, and as shown in FIG. 5, the inwardly facing shoulder 82a of an enlarged outer end 82 on each such tubular member is welded at 83 to the end surfaces 43 and 44 surrounding each of the inlet and outlet of the body. The outer side of this enlarged end 82 of each tubular member is beveled at 84 for suitable connection, as by welding, into the conduit or pipeline in which the valve is to be disposed. The inner diameter of the tubular members 81 as well as the inner diameter of the seats 79 are at least approximately equal to that of the opening 16 through the valve member so as to form, as in the case of the valve 10, a full opening therethrough. For reasons more fully understood from the description to follow, the outer diameter of the inner end of each tubular member is smaller than the diameter of either the inlet or outlet so as to provide a space therebetween, the continuous annular weld 83 closing the space to seal the valve body.

As in the case of the seats 21 of the previously described valve, the inner ends of seats 79 are spherical for concentric engagement with opposite sides of the valve member. An intermediate portion 84 (see FIG. 6) of the outer diameter of each seat fits closely within the counterbore 80, and the outer portion of each seat has its outer diameter reduced as at 85 to form a substantially enclosed annular space between each seat and its tubular retainer 81. As best shown in FIG. 6, this reduced outer end of the seat extends rearwardly into engagement with a Belleville-type spring 86 which, through its engagement with the tubular element 81, yieldably urges the inner end of the seat tightly into engagement with the valve member.

Each seat is sealed with respect to the counterbore 80 of the tubular retainer by means of a seal ring 87 of any suitable resilient material. This ring is received in the inner end of each annular recess and backed up by means of a rigid expander ring 88 which is triangular in cross section to provide an outwardly tapered surface which is urged inwardly against the seal ring by means of a wavy spring 89 tightly compressed between the back of the expander ring and the inner side of the spring 86. This wavy spring 89 not only constantly urges the tapered ring 88 against the seal ring 87 to deform it outwardly into sealing engagement with the counterbore 80, but also performs this function in a manner independently of the spring 86. That is, the sealing ring 87 may be forced into sealing engagement with the counterbore with a force different from the force which urges the inner end of the seat into engagement with the valve member.

Figure 7:
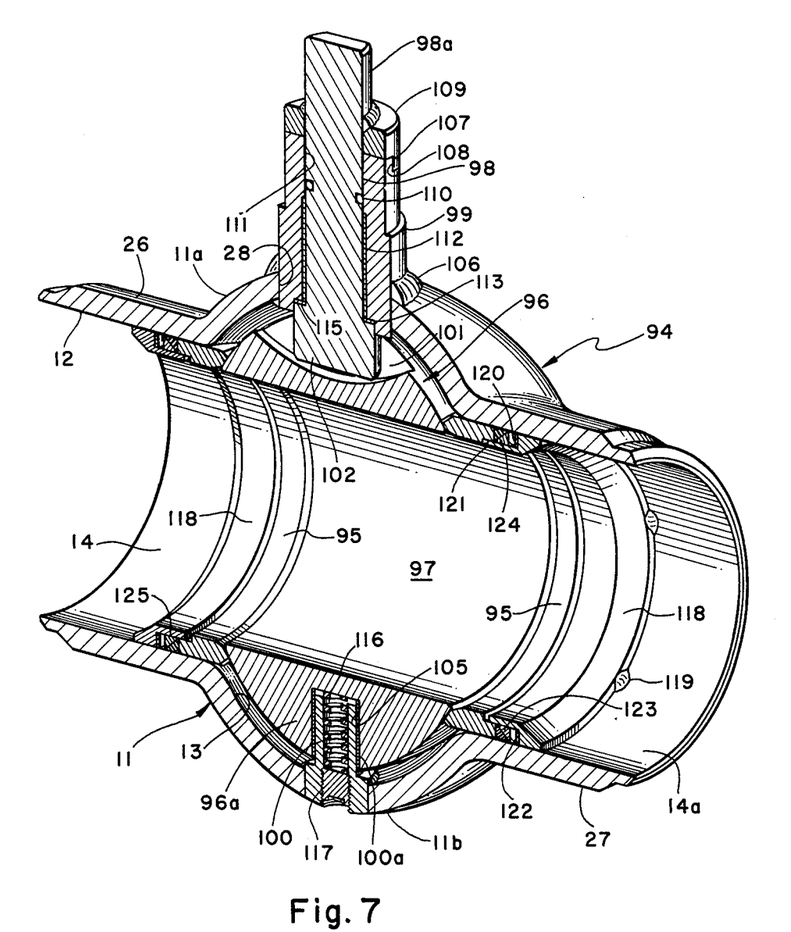
FIG. 7 is a longitudinal sectional view in perspective of still another embodiment of a valve constructed in accordance with the present invention.
Figure 8:
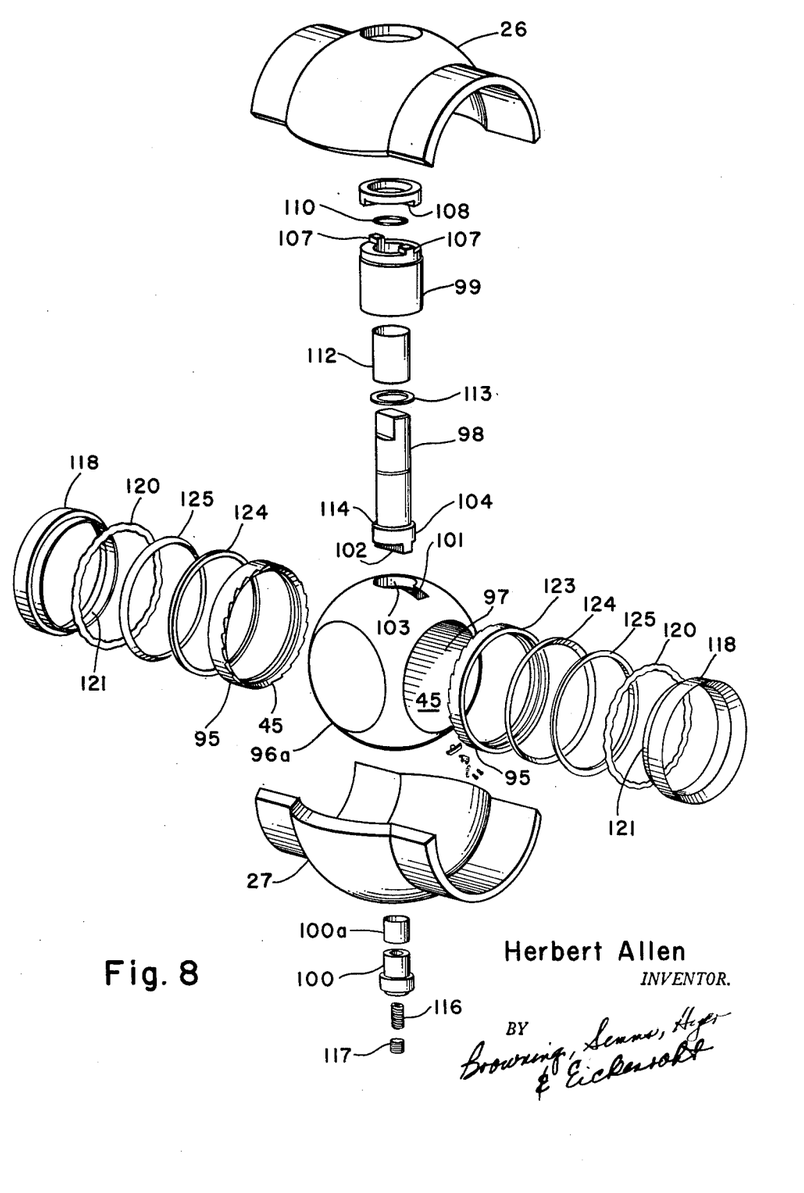
FIG. 8 is an exploded perspective view of the valve of FIG. 7.

With reference now to the embodiment of the valve illustrated in FIGS. 7 and 8 and indicated in its entirety by reference character 94, it will be seen to comprise a body 11 corresponding in several respects to the body of the valve 10. When this similarity exists, identical reference characters have been used. The principal difference between the valve 94 and the valve 10 is the construction of the valve member 96 and the manner in which it is mounted for rotation within the chamber 13 of the valve body, as well as the construction and mounting of the annular seats 95 which, as shown in FIG. 7, engage opposite sides of the valve member.

Thus, as compared with the valve member 15 of the valves 10 and 78, the valve member 96 comprises a separate spherically-shaped closure part 96a having an opening 97 therethrough. One side of this part is connected for rotation to a separate stem 98 which is journaled for rotation in an upper bearing 99 of the valve body part 11a, and the other side has a cylindrical recess 105 therein which is arranged coaxially of the stem 98 and fits closely over an upwardly extending pin or stem 100 for rotation thereabout. More particularly, the top side of the spherically-shaped closure part of the valve member has a transversely extending slot 101 adapted to closely receive a similarly constructed rib 102 on the lower end of the stem 98 to provide a rotary drive connection therebetween. As best shown in FIG. 8, the central portion of the slot 101 is intersected by a cylindrical opening 103 which receives a cylindrical portion 104 on the lower end of the stem 98 just above the rib 102 so as to maintain the axis of rotation of the closure part in alignment with that of the stem. As will be understood from the drawings, the aligned axes of rotation provided by the bearings 100 and 99 are disposed transversely of the axis of the flowway 12 of the valve body so that the valve member can be turned by the upper end 98a of the stem 98 between opened and closed positions.

This particular construction of the valve member and the means on the valve body and valve member cooperable to mount the valve member for opening and closing movement has a twofold advantage. In the first place, it enables inexpensive manufacture of the closure part of the valve member since the stems of the valve member 15 of the previously described valves are not formed thereon. Thus, the valve member is manufactured from a simple sphere which need merely have the flow opening therethrough, the slot 101, and the recess 105 formed therein. Also, the separation of the stem 98 from the closure part of the valve member enables it to be constructed of a more expensive and stronger material for resisting the torque applied to it in rotating the valve member between opened and closed positions.

The upper bearing 99 of the body part 11a is generally tubular and connected to the valve body member 26 within the opening 28 therein by means of weldment 106.

The upper end of the bearing 99 is provided with a pair of oppositely disposed shoulders 107 which form stops for engagement with shoulders 108 on a ring 109 welded or otherwise secured to the upper end 98a of the stem. More particularly, the bearing 99 is so located upon connection to the body member 26 as to dispose the stops thereon in a rotational position about the axis of rotation of the valve member which will locate the valve member in its opened and closed positions.

The stem 98 is provided with an annular recess about an intermediate portion thereof which carries an O-ring 110 for sealing engagement during its rotation within the opening 111 through the bearing 99. There is a sleeve bearing 112 of Teflon or other suitable material received between the stem and journal opening 111 just beneath the seal ring 110, and a thrust bearing 113 is received between a shoulder 114 on the upper end of the cylindrical part 104 of the stem 98 and a downwardly facing shoulder 115 on the lower counterbored end of the bearing 99. The shoulder 114 on the part 104 is urged tightly against the thrust bearing 113 by means of a compression coil spring 116 held between the closed end of the bearing pin 100 and the upper closed end of the recess 105 in the closure part of the valve member 96. More particularly, this spring exerts a force between the valve body and the valve member which urges the latter through the previously described drive connection of the valve member and stem to the thrust bearing 113. As best shown in FIG. 7, the lower end of the bearing pin 100 is closed by means of a removable drain plug 117, and there is a sleeve bearing 100a disposed between the pin and the recess 105.

The seats 95 correspond in several respects to the seats 21 of the valve 10 in that each is releasably retained within the inlet and outlet by means of a tubular member 118 received therein and connected thereto, as by welding 119. More particularly, the inner end of each seat 95 is urged into tight engagement with the valve member by means of a wavy spring 120 or the like disposed between the inner end of the retainer and the rear of the seat.

In other respects, however, each seat 95 and its mounting is similar to the seat 79 of the valve 78. Thus, as shown in FIG. 7, the outer end of each seat has an enlarged inner diameter which slidably receives the forwardly directed flange 121 on the inner end of each tubular retainer member 118. This flange defines an annular recess between the inwardly facing shoulder 122 on the enlarged outer end of the tubular retainer and the outer end 123 of the seat. An annular ring 124 of suitable sealing material is disposed within the forward end of each such recess and is backed up by means of a ring 125 which is triangular in cross section to provide an outwardly tapered surface which is urged forwardly by the spring 120 to thereby deform the seal ring 124 inwardly and outwardly into sealing engagement between the seat and each of the inlet and outlet 14 and 14a. Thus, in the case of the seat 95, as distinguished from the seat 79 of the valve 78, the single spring 120 performs the dual purpose of maintaining the inner end of each seat in engagement with the valve member and urging the seal ring 124 into sealing engagement between the seat and inlet or outlet within which the seat is slidable.

As shown at 46 in FIG. 8, a mechanism similar to that described in connection with the other two valves is mounted on each side of the valve member for imparting rotation to each seat 95 as the valve member 96 is moved between opened and closed positions. Thus, as in the case of the previously described seats, each of the seats 95 is provided with teeth 45 thereabout for engagement by the dog 48 of the mechanism 46 in the manner previously described.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough, a ball-shaped valve member mounted within the body for rotation between flowway opening and closing positions, an annular seat rotatably mounted within the flowway for engagement with the valve member, teeth about the seat, a dog pivotally mounted on the valve member to engage and follow a tooth on the seat, upon rotation of the valve member in one direction between opened and closed positions, and then move past said teeth, upon rotation of the valve member in the opposite direction, to thereby rotate the seat from one rotational position to a different rotational position.

2. A valve, comprising a body having a flowway therethrough, a ball-shaped valve member having an opening therethrough and rotatably mounted within the valve body for opening and closing the flowway, a seat having an opening therethrough and rotatably received within the flowway to engage a spherical surface on the valve member, ratchet teeth about the periphery of the seat adjacent the surface of the valve member, a dog pivotally mounted on the valve member, a stop on the valve member to locate the dog in position to engage the front of a ratchet tooth upon rotation of the valve member in one direcion, and spring means connected between the dog and valve member to urge the dog against the stop and maintain it in engagement with said tooth upon continued rotation in said one direction, said spring means being yieldable to permit the dog to move away from the stop and ride over the backs of the teeth upon rotation of the valve member in the opposite direction.

3. A valve, comprising a valve body having a flowway extending longitudinally therethrough, a spherically shaped closure member within the valve body and having a port therethrough and stems fixed to its opposite sides, said valve body including separate parts each having a bearing thereon fitting over a stem of the closure member to mount it for rotation between flowway opening and closing positions, said body parts having longitudinal edges welded to one another along a plane passing through the axis of the flowway and perpendicular to the axis of rotation of the closure member, the inner surfaces of said body parts being curved to provide an enlarged central portion fitting relatively closely about the closure member intermediate end openings on said body parts which are smaller in diameter than the diameter of the closure member, each body part being unitary between its bearings, longitudinal edges, and its portions of the end openings, an annular seat engaged with an end of the closure member, means including a tubular member welded to the end opening in the welded body parts adjacent said end of the closure member and having an inwardly facing abutment surface thereon spaced outwardly of the enlarged central portion of the valve body, and spring means disposed between the abutment surface and an outwardly facing abutment surface on said seat for retaining the inner end of said seat in engagement with said closure member, each of the port through said closure member and the openings through said seat and tubular member having substantially the same diameter to provide a full opening passageway through the valve in its open position.

References Cited in the file of this patent

UNITED STATES PATENTS

| | | |
|---|---|---|
| 1,183,012 | Kunzer | May 16, 1916 |
| 1,825,364 | Ross | Sept. 29, 1931 |
| 2,049,805 | Heinen | Aug. 4, 1936 |
| 2,086,001 | Shaw | July 6, 1937 |
| 2,446,496 | Tautz | Aug. 3, 1948 |
| 2,520,288 | Shand | Aug. 29, 1950 |
| 2,573,177 | Bohlen | Oct. 30, 1951 |
| 2,890,017 | Shafer | June 9, 1959 |
| 2,977,975 | Allen | Apr. 4, 1961 |
| 2,977,976 | Allen | Apr. 4, 1961 |
| 3,036,590 | Knox | May 29, 1962 |

FOREIGN PATENTS

| | | |
|---|---|---|
| 177,996 | Switzerland | of 1935 |
| 863,183 | Germany | of 1953 |